United States Patent [19]

Sircar et al.

[11] Patent Number: 5,116,510
[45] Date of Patent: May 26, 1992

[54] SEPARATION OF LIQUID MIXTURES BY THERMAL SWING ADSORPTION

[75] Inventors: Shivaji Sircar, Wescosville; Madhukar B. Rao, Allentown, both of Pa.

[73] Assignee: Air Products and Chemicals, Inc., Allentown, Pa.

[21] Appl. No.: 696,476

[22] Filed: May 6, 1991

[51] Int. Cl.⁵ .............................................. B01D 15/00
[52] U.S. Cl. .................................. 210/673; 210/674; 210/677; 210/678; 210/670; 210/660
[58] Field of Search ............... 210/689, 670, 672, 673, 210/677, 678, 674; 55/32, 33, 35; 423/658.2; 208/245

[56] References Cited

U.S. PATENT DOCUMENTS

| | | | |
|---|---|---|---|
| 3,620,969 | 11/1971 | Turnock et al. | 502/55 |
| 4,373,935 | 2/1983 | Ausikaitis et al. | 210/689 |
| 4,398,927 | 8/1983 | Asher et al. | 55/34 |
| 4,537,760 | 8/1985 | Lavie | 55/70 |
| 4,704,267 | 11/1987 | Di Martino | 423/658.2 |
| 4,726,818 | 2/1988 | Yeung et al. | 210/689 |
| 4,758,253 | 7/1988 | Davidson et al. | 502/400 |
| 5,012,037 | 4/1991 | Doshi | 55/33 |
| 5,013,334 | 5/1991 | Maurer | 55/33 |
| 5,026,482 | 6/1991 | Sircar | 210/674 |

OTHER PUBLICATIONS

R. W. Rousseau, Handbook of Separation Press Technology, Wiley Interscience (1987), Section 12.5-4.
U.S. Application Ser. No. 07/412,961, S. Sircar.

Primary Examiner—Stanley S. Silverman
Assistant Examiner—Cynthia L. Nessler
Attorney, Agent, or Firm—Robert J. Wolff; James C. Simmons; Mark L. Rodgers

[57] ABSTRACT

A new thermal swing adsorption process for the separation of a bulk liquid mixture into its respective components wherein a novel rinse step is employed to achieve high product recovery with a low energy of separation. The invention is particularly useful for separating liquid mixtures containing azeotropes or close-boiling components which are difficult to separate using conventional techniques such as distillation or routine termal swing adsorption. A given example is the separation and recovery of methyl acetate from a bulk liquid mixture containing methyl acetate and water.

9 Claims, 1 Drawing Sheet

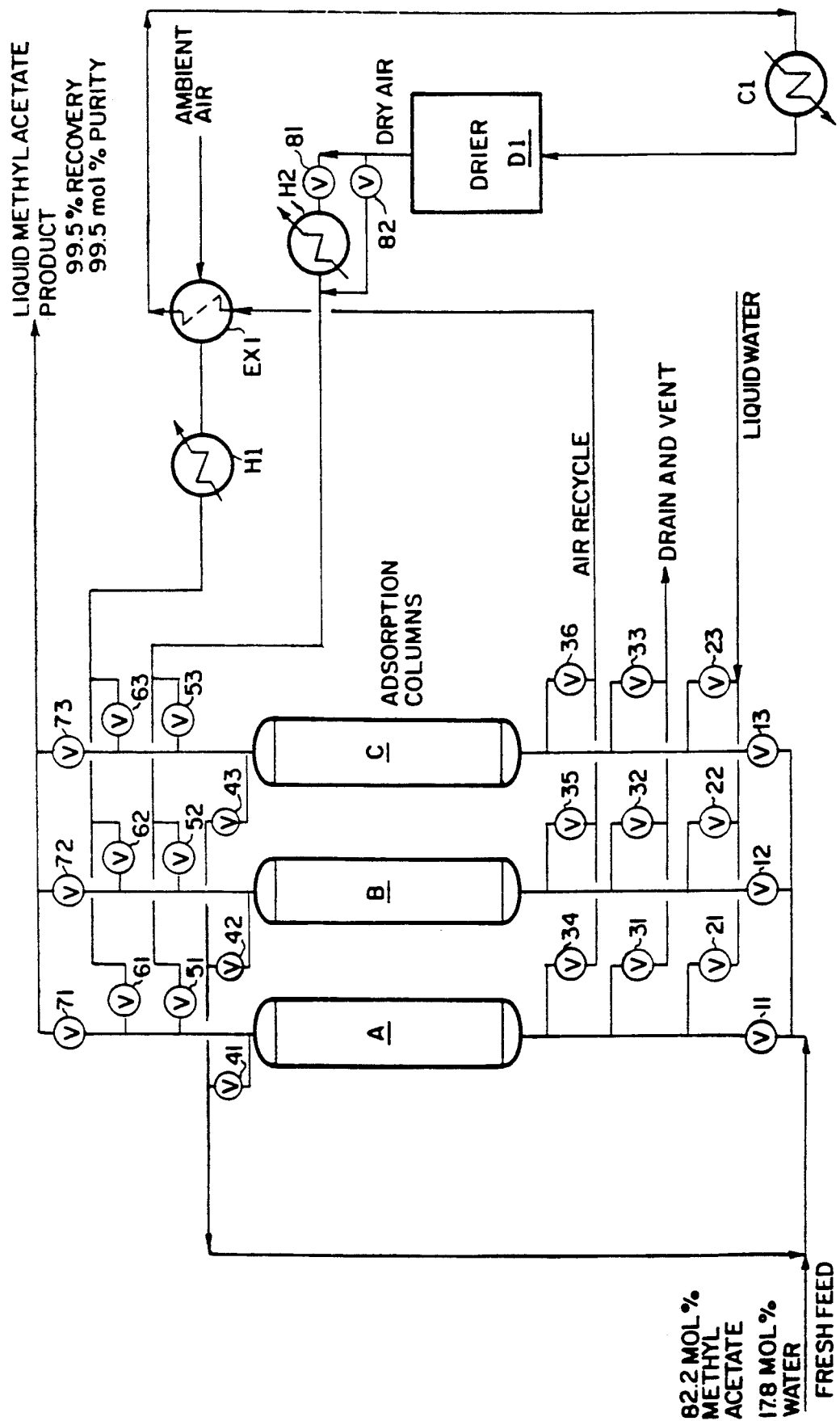

SEPARATION OF LIQUID MIXTURES BY THERMAL SWING ADSORPTION

TECHNICAL FIELD

The present invention relates to the separation and recovery of individual components from a liquid mixture by thermal swing adsorption.

BACKGROUND OF THE INVENTION

As noted in Section 12.5-4 of the Handbook Of Separation Process Technology by R. W. Rousseau, Wiley Interscience (1987), thermal swing adsorption (TSA) is a common practice for the removal of trace or dilute impurities from liquid streams. The conventional TSA process consists of the following steps:

(a) flowing the contaminated liquid through a column packed with an adsorbent which selectively adsorbs the trace impurities and produces a pure product stream;

(b) draining the adsorption column to remove 40-50% of the entrained liquid from the column;

(c) heating the column to vaporize and desorb the remaining portion of the entrained liquid as well as the adsorbed impurities;

(d) cooling the column back down to the liquid feed temperature;

(e) filling the column with a portion of the purified liquid or feed liquid thereby making the column ready to start a new cycle beginning with step (a).

The above described process is usually adequate for purification of many liquid streams. It is commercially being used for removal of trace or dilute impurities (such as hydrocarbons) from water and drying of liquid hydrocarbons. There are two major practical problems with the above described process however as follows:

(1) When the liquid being purified is expensive, a very high recovery of this liquid is required. The problem is that a substantial portion of the product liquid may be lost during step (c) of the process. This is because the bulk liquid trapped in the voids of the solid adsorbent as well as that co-adsorbed with the impurity to be removed does not come out of the column during the drain step (b) but is instead vaporized and desorbed during step (c). Consequently, the column effluent during step (c) contains a large quantity of the component being purified along with the desorbed impurities. If the loss of the component being purified cannot be tolerated, a secondary separation process such as partial condensation or distillation is required to recover that component. That can be very expensive, particularly if the impurities form an azeotrope or a close boiling mixture with the product liquid.

(2) When the impurity to be removed is present in bulk quantities (greater than 2.0 mole %) and the quantity of the liquid to be purified is large, a very large volume of adsorbent is required. Since the cycle time of a conventional thermal swing adsorption process is controlled by the heating and cooling times (which are typically on the order of hours) a large volume of adsorbent is necessary to retain the large quantity of impurity present in the feed liquid mixture during the adsorption step. This leads to large losses of the desired product during the heating step as discussed in (1) above.

SUMMARY OF THE INVENTION

The present invention is a new thermal swing adsorption process for the separation of a bulk liquid mixture into its respective components. The present invention resolves the recovery loss problem of the conventional TSA process as discussed above. In addition to superior product recovery, the present invention also has much broader applicability than the conventional TSA process in that (1) it can be used for the removal of bulk (greater than 2.0 mole %) impurities and (2) it provides for the separate recovery of the impurity as a secondary product if desired. Heretofore, TSA has been confined to the removal of trace (less than or equal to 2.0 mole %) impurities and to the recovery of only one product.

The steps of the invention are as follows:

(a) flowing the liquid mixture through a column packed with an adsorbent which selectively adsorbs component (A) as the more adsorbable component while allowing component (B) to pass through the column as the less adsorbable component;

(b) rinsing the adsorbent with a sufficient quantity of component (A) to saturate the column with component (A) while recycling the rinse effluent as feed;

(c) draining the column to remove 40-50% of the entrained liquid which entrained liquid is essentially component (A);

(d) heating the column to vaporize and desorb the remaining portion of entrained (A) liquid;

(e) cooling the column back down to the adsorption step temperature;

(f) filling the column with component (B) thereby making the column ready to start a new cycle beginning with step (a).

The operation of the invention will be fully understood and its advantages more fully appreciated from the detailed description which follows.

The single FIGURE of the drawing is a flow diagram of one embodiment of the invention as it relates to the separation and recovery of methyl acetate from a bulk liquid mixture containing methyl acetate and water. This embodiment employs a group of three adsorption columns which each undergo their respective cycle of steps while collectively operated sequentially in parallel with one another. It is emphasized that this embodiment is an example only. The process can be used to separate other bulk liquid mixtures and can employ any number of columns including a single column.

DETAILED DESCRIPTION OF THE INVENTION

The present invention is a new thermal swing adsorption (TSA) process for the separation of a bulk liquid mixture into its respective components. TSA processes are so named because the adsorption/desorption steps of the process are carried out by thermal changes inside the adsorption column. The steps of the present invention are as follows:

a) Adsorption Step

The liquid feedstock comprising component (A) as the more adsorbable component and component (B) as the less adsorbable component is introduced into the feed end of an adsorption column. It should be noted that component (A) can be a single species or a mixture of more adsorbable species. Likewise, component (B) can be a single species or a mixture of less adsorbable species. The column is packed with a solid adsorbent which selectively adsorbs component A while allowing component B to pass through the column as the primary product. Eventually, the capacity of the adsorbent to adsorb component (A) will be reached at which time component (A) will begin to breakthrough the column as part of the column effluent. Upon, or just short of such breakthrough occurring, the flow of feedstock into the column is discontinued.

b) Rinse Step

The purpose of the rinse step is to displace that portion of component (B) which remains in the column at the end of step (a) (either because it was trapped in the voids of the adsorbent or because it was co-adsorbed with the more adsorbable component) and recycle it as feed so that it is not vaporized and lost during the heating step. In so doing, the recovery of component (B) is significantly increased.

At the end of step (a), the column is rinsed with a liquid stream enriched in component (A) in a direction co-current to the feedstock flow. The effluent during this step is a mixture of components (A) and (B) which has a feed like composition and is recycled as feed. The rinse step is continued until the column is saturated with component (A).

c) Drain Step

Step (c) is the first step performed toward accomplishing regeneration of the column. At the end of step (b), the column is drained to remove the entrained liquid. Because the entrained liquid is essentially component (A), it can be recycled for use as rinse liquid in step (b) of a subsequent cycle or withdrawn as an (A) rich product.

d) Heating Step

The purpose of the heating step is to vaporize and desorb the remaining portion of entrained (A) liquid left in the column at the end of step (c). At the end of step (c), the column is heated to a temperature greater than component (A)'s boiling point. Typically, the column is heated to a temperature of 200°–600° F. The heating is accomplished by flowing a hot non-sorbable gas (i.e. a gas that will not be significantly adsorbed by the adsorbent) through the column which gas vaporizes and desorbs component (A). Examples of non-sorbable gases are air and nitrogen. The column effluent during this step contains the hot gas laden with vaporized component (A) and can be recycled to a heat exchanger so that its heat can be recovered and used for making the hot non-sorbable gas required in step (d) of a subsequent cycle. Where recovery of component (A) as a secondary product is desired, the effluent can further be recycled to a condenser to condense out component (A). A portion of the component (A) produced in this manner can also be used in the rinse step. The uncondensed non-sorbable gas can then be heated for reuse as the hot non-sorbable gas required in step (d) of a subsequent cycle.

e) Cooling Step

At the end of step (d), the column is cooled to a temperature less than the liquid feedstock's boiling point by flowing a relatively cold non-sorbable gas through the adsorption column. The effluent during this step consists of the non-sorbable gas (now warmer) which can be cooled for reuse as the cold non-sorbable gas required in step (e) of a subsequent cycle.

f) Filling Step

The final regeneration step consists of filling the adsorption column with component (B). The column is filled with component (B) in a direction counter-current to the feedstock flow. The column is now ready to start a new cycle beginning with step (a).

Examples of liquid mixtures that can be separated by the present invention include mixtures of (1) methyl acetate and water (discussed in the following example), (2) ethanol and water, (3) acetaldehyde and water, (4) dimethylether and water, (5) acetaldehyde and vinyl acetate, (6) ethanol and vinyl acetate and (7) dimethylether and ethanol. All of these mixtures lend themselves to the present invention because (1) they are difficult to separate by conventional distillation and (2) the more adsorbable component is expensive and thus a high recovery of such component is important.

Typical adsorbents that can be used in the practice of the invention include zeolites, activated carbons, alumina gels and silica gels. In general, the adsorbent must have a high capacity to adsorb the more adsorbable component, especially when such component is present in the mixture in bulk concentrations.

Operating temperatures inside the adsorption column vary between the temperature of the liquid feedstock and the heating step temperature. Operating pressures inside the adsorption column are typically 0–40 psig throughout the entire cycle. Pumps (for the liquid feed, liquid rinse and liquid fill steps) and blowers (for the gas heating and gas cooling steps) can be used to account for the pressure drops that will occur through the column and associated piping.

Typical product purities which can be achieved by the invention are 95% to 99.5% plus for both components. Typical recoveries are also in the 95% to 99.5% plus range for both components.

EXAMPLE

The following example illustrates one embodiment of the invention as it relates to the separation and recovery of methyl acetate from a bulk liquid mixture containing 82.2 mole % methyl acetate (boiling point: 45° C.) and 17.8 mole % water (boiling point: 100° C.). Separation of this mixture (which forms an azeotropic solution at approximately 10.0 mole % water) by distillation is very capital and energy intensive and the present invention can be conveniently used. A 13X zeolite is used as the adsorbent which very selectively adsorbs water from methyl acetate at a very high capacity. Air is used as the non-sorbable gas. The single FIGURE of the drawing is a flow diagram of this embodiment. The flow diagram consists of three parallel adsorption columns A, B and C; heaters H1 and H2; a cooler/condenser C1; a pressure swing or thermal swing drier D1; a heat exchanger EX1; numerous switching valves and the connecting lines.

Referring now to the drawing, the liquid feed mixture comprising water as the more adsorbable component and methyl acetate as the less adsorbable component enters column A through valve 11 at 70°–120° F. The water is selectively adsorbed by the 13X zeolite while the methyl acetate passes through valve 71 as the product. The flow of feed is discontinued upon, or just short of, breakthrough of water into the column effluent.

When adsorption is complete, the column is rinsed with liquid water through valve 21 until the column is saturated with water. The rinse effluent passes through valve 41 as recycled feed to another column.

When the rinse step is complete, the column is drained through valve 31 to remove 40–50% of the entrained water. Since water is inexpensive, the drain water is discarded rather than recycled for use as rinse liquid.

When the drain step is complete, the remaining water is vaporized and carried away during the heating step. In this particular application, the heating step is split into two parts. In the first part, most of the remaining water is vaporized by heating incoming ambient air to 400°–600° F. in heater H1 and flowing the resulting hot air through valve 61. The effluent during this first part of the heating step consists of hot air and most of the remaining water (now vaporized) and is discarded through valve 31. In the second part of the heating step, the final portion of the remaining water is vaporized by heating recycled air (which recycled air has been dried in drier D1) to 400°–600° F. in heater H2 and flowing the resulting hot dry air through valve 51. The effluent during the second part of the heating step consists of hot air and the final small portion of the remaining water (now vaporized) and is recycled through valve 34 to heat exchanger EX1 to partially accomplish the heating of the incoming air for the heating step of a subsequent cycle. After discharge from heat exchanger EX1, the wet air is recycled to cooler/condenser C1 where most of the water is condensed out. The air is then further dried in drier D1 after which it enters heater H2 through valve 81 where it is heated for reuse in the second part of a subsequent cycle's heating step.

When the heating step is complete, the column is cooled back down to the feedstock temperature by flowing unheated recycled air through valve 51 via valve 82. The recycled air has been previously cooled in cooler/condenser C1 and dried in drier D1. The effluent during this step consists of warmed air (possibly mixed with trace amount of water vapor still remaining in the column) and is also recycled through valve 34 to heat exchanger EX1 to partially accomplish the heating of the incoming air. After discharge from heat exchanger EX1, the effluent from the cooling step is cooled in cooler/condenser C1 and dried in drier D1 for reuse as the air in the cooling step of a subsequent cycle. (Although the heating and cooling gas has been described as passing through the column in a direction countercurrent to the feed flow, the direction can also be cocurrent to the feed flow.)

The final step consist of filling the cooled column with methyl acetate liquid thereby making the column ready to start a new cycle beginning with reintroduction of the liquid feed mixture.

Each of the three columns in the single FIGURE of the drawing undergoes the above cycle of steps while collectively operated sequentially in parallel with one another according to the column operating schedule as shown in the following Table 1. The table utilizes 15 segments to cover the six separate steps in the cycle so that the relative times for each step can be clearly indicated.

TABLE 1

| Column | Segment | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| A | A | A | A | A | A | R | D | Ha | Ha | Ha | Ha | Ha | Hd | Cd | F |
| B | Ha | Ha | Hd | Cd | F | A | A | A | A | A | R | D | Ha | Ha | Ha |
| C | R | D | Ha | Ha | Ha | Ha | Ha | Hd | Cd | F | A | A | A | A | A |

A = Adsorption
R = Rinse
D = Drain
Ha = Ambient Air Heating
Hd = Dry Air Heating
Cd = Dry Air Cooling
F = Fill The position of the valves in the single FIGURE of the drawing during Table 1's 15 segment cycle is shown in the following Table 2. A "0" indicates the valve is open while a blank indicates the valve is closed.

TABLE 2

| Valve No. | Segment | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 11 | 0 | 0 | 0 | 0 | 0 | | | | | | | | | | |
| 12 | | | | | | 0 | 0 | 0 | 0 | 0 | | | | | |
| 13 | | | | | | | | | | | 0 | 0 | 0 | 0 | 0 |
| 21 | | | | | | 0 | | | | | | | | | |
| 22 | | | | | | | | | | | | 0 | | | |
| 23 | 0 | | | | | | | | | | | | | | |
| 31 | | | | | | | 0 | 0 | 0 | 0 | 0 | 0 | | | |
| 32 | 0 | 0 | | | | | | | | | | 0 | 0 | 0 | 0 |
| 33 | | 0 | 0 | 0 | 0 | 0 | 0 | | | | | | | | |
| 34 | | | | | | | | | | | | | 0 | 0 | |
| 35 | | | 0 | 0 | | | | | | | | | | | |
| 36 | | | | | | | | 0 | 0 | | | | | | |
| 41 | | | | | | 0 | | | | | | | | | |
| 42 | | | | | | | | | | | | 0 | | | |
| 43 | 0 | | | | | | | | | | | | | | |
| 51 | | | | | | | | | | | | | 0 | 0 | |
| 52 | | | 0 | 0 | | | | | | | | | | | |
| 53 | | | | | | | | 0 | 0 | | | | | | |
| 61 | | | | | | | | 0 | 0 | 0 | 0 | 0 | | | |
| 62 | 0 | 0 | | | | | | | | | | | 0 | 0 | 0 |
| 63 | | | 0 | 0 | 0 | 0 | 0 | | | | | | | | |
| 71 | 0 | 0 | 0 | 0 | 0 | | | | | | | | | | 0 |
| 72 | | | | | | 0 | 0 | 0 | 0 | 0 | 0 | | | | |
| 73 | | | | | | | | | | | 0 | 0 | 0 | 0 | 0 |
| 81 | 0 | 0 | | | | 0 | 0 | | | 0 | 0 | 0 | 0 | 0 | 0 |
| 82 | | | | | 0 | | | | | 0 | | | | 0 | |

Based on the 13X zeolite's water adsorption capacity from methyl acetate and the adsorptive mass transfer coefficient for water from the binary mixture comprising 82.2 mole % methyl acetate and 17.8 mole % water, it was found that the above embodiment produces liquid methyl acetate product of a purity of 99.5 mole % and a recovery of 99.5%.

Having thus described the present invention, what is now deemed appropriate for Letters Patent is set forth in the following claims.

What is claimed is:

1. A process for separating a liquid feedstock comprising a more adsorbable component (A) and a less adsorbable component (B) with respect to an adsorbent in an adsorption column comprising:

(a) flowing the liquid feedstock through the adsorption column to selective adsorb component (A) while discharging a first liquid effluent stream comprising component (B) as a primary product, said flowing of the feedstock continuing until, or just short of, breakthrough of component (A) from the adsorption column;

(b) rinsing the adsorption column in a direction co-current to the feedstock flow with liquid component (A) while discharging a second liquid effluent stream comprising components (A) and (B) which is recycled as feed, said rinsing continuing until the adsorption column is saturated with component (A);

(c) draining the adsorption column to withdraw a third liquid effluent stream comprising a portion of component (A) left in the adsorption column at the end of step (b);

(d) heating the adsorption column to a temperature greater than component (A)'s boiling point by flowing a hot non-sorbable gas through the adsorption column to vaporize and desorb the remaining portion of component (A) left in the adsorption column at the end of step (c) while discharging a fourth gaseous effluent stream comprising vaporized component (A) and the hot non-sorbable gas;

(e) cooling the adsorption column to a temperature less than the liquid feedstock's boiling point by flowing a cold non-sorbable gas through the adsorption column while discharging a fifth gaseous effluent stream comprising the cold non-sorbable gas;

(f) filling the adsorption column in a direction counter-current to the feedstock flow with component (B) thereby making the column ready to start a new cycle beginning with step (a).

2. The process as defined in claim 1 wherein step (c) further comprises recycling said third liquid effluent stream for use as rinse liquid in step (c) of a subsequent cycle.

3. The process as defined in claim 1 wherein step (d) further comprises recycling said fourth gaseous effluent stream to a heat exchanger to recover its heat for use in making the hot non-sorbable gas required in step (d) of a subsequent cycle followed by further recycling said fourth gaseous effluent stream to a condenser to condense out component (A) as a secondary product followed by heating the uncondensed portion of said fourth gaseous effluent stream for reuse as the hot non-sorbable gas required in step (d) of a subsequent cycle.

4. The process as defined in claim 1 wherein step (e) further comprises cooling said fifth gaseous effluent stream for reuse as the cold non-sorbable gas required in step (e) of a subsequent cycle.

5. The process as defined in claim 1 wherein component (A) comprises a mixture of more adsorbable species and component (B) comprises a mixture of less adsorbable species.

6. The process as defined in claim 1 wherein the separation of the liquid feedstock is effected in a defined system comprising a plurality of adsorption columns containing said adsorbent, which adsorption columns each undergo their respective cycle of steps while collectively operated sequentially in parallel with one another.

7. The process as defined in claim 6 wherein component (A) is water, component (B) is methyl acetate, the non-sorbable gas is air and the adsorbent is 13X zeolite.

8. The process as defined in claim 7 wherein step (d) further comprises recycling said fourth gaseous effluent stream to a heat exchanger to recover its heat for use in making the hot non-sorbable gas required in step (d) of a subsequent cycle followed by drying and heating a portion of said fourth gaseous effluent stream for reuse as a portion of the hot non-sorbable gas required in step (d) of a subsequent cycle.

9. The process as defined in claim 8 wherein step (e) further comprises cooling and drying said fifth gaseous effluent stream for reuse as the cold non-sorbable gas required in step (e) of a subsequent cycle.